United States Patent [19]

Desai et al.

[11] Patent Number: 5,280,601
[45] Date of Patent: Jan. 18, 1994

[54] BUFFER MEMORY CONTROL SYSTEM FOR A MAGNETIC DISC CONTROLLER

[75] Inventors: Dhiru N. Desai, San Jose; David M. Lewis, Santa Cruz, both of Calif.

[73] Assignee: Seagate Technology, Inc., Scotts Valley, Calif.

[21] Appl. No.: 487,740

[22] Filed: Mar. 2, 1990

[51] Int. Cl.⁵ .................... G06F 13/12; G06F 12/06
[52] U.S. Cl. .................... 395/425; 345/275; 365/203; 365/230.03; 365/233; 365/238.5; 365/189.02; 364/238.3; 364/238.4; 364/927.97; 364/DIG. 1; 371/48
[58] Field of Search .............. 395/600, 425, 325, 575, 395/400, 160; 345/275; 365/203, 230.03, 233, 184, 238.5

[56] References Cited

U.S. PATENT DOCUMENTS

| | | | |
|---|---|---|---|
| 4,514,806 | 4/1985 | Hartig | 395/575 |
| 4,581,721 | 4/1986 | Gunawardana | 365/230.09 |
| 4,683,555 | 7/1987 | Pinkham | 365/189 |
| 4,819,152 | 4/1989 | Deerfield | 395/575 |
| 4,839,856 | 6/1989 | Tanaka | 395/425 |
| 4,845,664 | 7/1989 | Aichelmann, Jr. et al. | 395/425 |
| 4,888,773 | 12/1989 | Arlington et al. | 371/40.2 |
| 4,916,603 | 4/1990 | Ryan et al. | 345/166 |
| 4,916,654 | 4/1990 | Sherman et al. | 395/166 |
| 4,992,956 | 2/1991 | Kaku et al. | 395/114 |
| 5,007,020 | 4/1991 | Inskeep | 395/400 |
| 5,014,187 | 5/1991 | Debize et al. | 395/425 |
| 5,057,837 | 10/1991 | Cowell | 341/55 |
| 5,058,005 | 10/1991 | Culley | 395/550 |
| 5,065,312 | 10/1991 | Bruckert et al. | 395/575 |

*Primary Examiner*—Thomas C. Lee
*Assistant Examiner*—Paul Lintz
*Attorney, Agent, or Firm*—Flehr, Hohbach, Test, Albritton & Herbert

[57] ABSTRACT

A method for temporarily storing and retrieving 8-bit character information data for a magnetic disk information storage system in a number of 4×n DRAM buffer memory configurations. A virtual memory address for each of said 8-bit information characters is provided and each of the characters are organized into a 16-byte block. The virtual memory addresses are translated to corresponding addresses of memory locations in said 4×n buffer memory unit for storage of 4-bit groups of said 16-byte block in said 4×n DRAM buffer memory by selecting a row address for storage of said 16-byte block, by selecting a base column address for said 16-byte block, and by successively incrementing said base column address by 4 to provide additional column address for successive 4-bit groups of said 16-byte blocks. Each of said 4-bit groups of said 16-byte block are transferred through a 4-bit data bus to the various predetermined address locations in one of said 4×n DRAM buffer memory configurations as determined by the translating step. An 8-bit parity word for the 16-byte block is stored in a separate part of the 4×n memory.

16 Claims, 15 Drawing Sheets

NORMAL PAGE MODE BLOCK (16-BYTE) TRANSFER

STATIC-COLUMN MODE BLOCK TRANSFER

INTERLEAVED PAGE MODE BLOCK TRANSFER

BUFFER MEMORY CONTROL SYSTEM FOR A MAGNETIC DISC CONTROLLER

BACKGROUND OF THE INVENTION

1. Field of the Invention

This invention relates to memory systems and, more particularly, to methods for controlling buffer memory systems for magnetic disk memory systems.

2. Prior Art

Temporary storage devices such as dynamic random access memory devices, DRAMs, are often used in connection with magnetic storage media as buffer memories for temporarily storing character information. Each character is represented, for example, by an 8-bit information word and one parity bit. Typically, information is read into a temporary storage memory device one character at a time using 9 parallel data bit lines. DRAMs are typically available as a 4 or 1-bit wide devices so that storage of the extra parity bit associated with each character word is cumbersome, resulting in the parity bit not being stored or being stored in a separate memory device.

SUMMARY OF THE INVENTION

It is an object of the invention to provide a controller for DRAM buffer memories for a magnetic disk storage system, where the controller provides for efficient use of low cost standard DRAM memories to store data and parity information in a variety of DRAM memory modes.

In accordance with this and other objects of the invention, a method of temporarily storing and retrieving 8-bit character data information for a magnetic disk information storage system in a number of $4 \times n$ DRAM buffer memory configurations is provided, where n is the size of the 4 bit-wide DRAM, e.g., n=32 Kb, n=64 Kb, n=256 Kb, etc. A virtual memory address is provided for each of said 8-bit information characters. The information characters are organized into a 16-byte block for storage. The virtual memory addresses are translated to corresponding addresses of memory locations in said $4 \times n$ buffer memory unit for storage of 4-bit groups of said 16-byte block in said $4 \times n$ DRAM buffer memory. This translating step includes the steps of: selecting a row address for storage of said 16-byte block; selecting a base column address for said 16-byte block; and successively incrementing said base column address by 4 to provide additional column address for successive 4-bit groups within said 16-byte blocks. Each of said 4-bit groups in said 16-byte block is transferred through a 4-bit data bus to the various predetermined address locations in one of said $4 \times n$ DRAM buffer memory configurations, said address locations determined by the previous translating step.

According to one aspect of the invention, the method further includes the steps of: providing an 8-bit parity word for said 16-byte blocks; selecting a parity-word row address; selecting a parity-word base column address for a first 4-bit group of said 8-bit parity word; and incrementing said parity-word column address to provide an second column address for a second 4-bit group of said 8-bit parity word. The error detection code word is then transferred through the 4-bit data bus to the various predetermined address locations for said 8-bit parity word in said $4 \times n$ memory unit.

The step of translating virtual memory addresses includes the step of selecting row and column addresses using multiplexer circuits. The method further includes the step of latching the row and column addresses into latch circuits and the step of incrementing the column addresses includes the step of feeding the outputs of said latch circuits through multiplexing circuits connected to the inputs of said latch circuits to increment the column addresses.

The $4 \times n$ memory unit is optionally a DRAM operating in a page mode or in a static-column mode.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
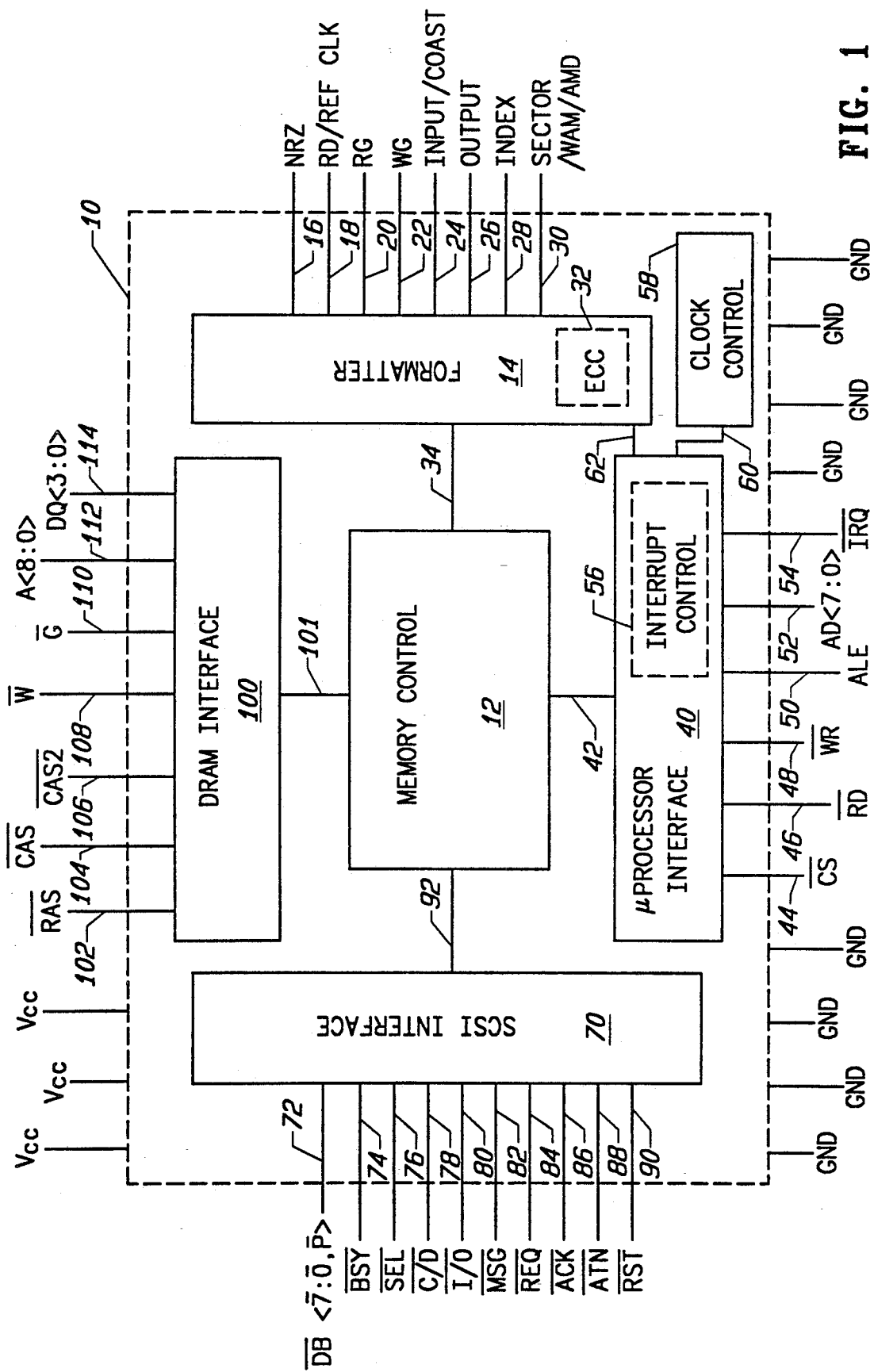
FIG. 1 is an overall functional block diagram of an integrated-circuit SCSI controller which includes a buffer memory DRAM interface circuit for communicating with a DRAM over a 4-bit data line.

FIG. 1 shows a block diagram of a 68-pin integrated circuit small computer system interface SCSI CONTROLLER CIRCUIT 10. As shown in the diagram, various interfaces are connected by signal buses to a memory control unit 12. A formatter block 14 provides an interface to a magnetic storage disc through various signal lines. The NRZ signal on line 16 is an input/output signal in an NRZ data format which provides a data bit stream to or from the logic in the formatter 14. The RD/REF CLK signal on line 18 is a read reference clock which is the clock signal for the formatter supplied by the data separator of the magnetic disc electronics. The frequency of this clock signal ranges from 5 Mhz to 24 Mhz. The read gate signal RG on signal line 20 is a signal which enables the read channel and causes the controller circuit 10 to input NRZ data to the magnetic disc. The right gate signal WG is a signal which enables the write drivers and causes the controller circuit 10 to output NRZ data to the magnetic disc. The INPUT/COAST signal on line 24 and the OUTPUT signal on line 26 are signals which are general purpose signals used to synchronize the formatter 14 with external hardware. The INDEX signal is a signal which is the index signal from the magnetic disc drive and is supplied once per revolution of the disc. The SECTOR/WAM/AMD signal on line 30 is a sector input, address mark detected input, or write address mark output to or from the formatter 14, depending on the operating mode of the system. The formatter 14 also contains an error correction code circuit ECC 32. Signals passing between the memory control unit 12 and the formatter 14 are carried on a signal bus 34.

Interfacing between the memory control unit 12 and an external microprocessor such as an 8051 Intel Controller is handled with a microprocessor interface circuit 40 which communicates with the memory control circuit 12 through a bus 42. An active low Chip Select signal on signal line 44 enables the controller integrated circuit 10 for either read or write operation. The active low read data signal RD on a signal line 46 in conjunction with the CS signal causes data from a specified register within the memory control circuit 12 to be moved to a data bus AD provided by the bus 52, as indicated. The microprocessor address/data bus AD(7:0) is an input/output bus with active high signals provided on bidirectional signal lines which interface to a multiplexed microprocessor address/data bus of the external microprocessor. A active low write data signal WR on a signal line 48 in connection with the CS signal causes data from the data bus AD to be moved to a specified register within the memory control unit 12. An interrupt request signal IRQ is an active low output signal from the microprocessor interface interrupt control circuit 56 to interrupt the external microprocessor. A clock control circuit 58 within the integrated circuit 10 provides appropriate clocks to a clock bus 60 to the microprocessor interface circuit 40. Signals from the microprocessor interface circuit 40 to the formatter 14 are provided on a bus 62.

A SCSI interface circuit 70 provides for communication on a SCSI bus and a memory control unit 12. The active low input/output signal lines in DB(7:0) are the SCSI data lines. An active low input/output busy SCSI control signal BSY is provided on a signal line 74. An active low input/output SCSI SEL control signal is provided on a signal line 76. An active low input/output command/data SCSI control signal C/D is provided on a signal line 78. An active low input/output message SCSI control signal is MSG as provided on signal line 82. An active low input/output request signal REQ in connection with an acknowledged active low input/output signal ACK on line 86 forms a SCSI data transfer handshake. An active low input/output SCSI attention control signal ATN is provided on signal line 88. An active low input/output SCSI reset signal is provided on a signal line 90. All of the above SCSI control signals are provided in accordance with the SCSI standards. The SCSI interface circuit 70 is coupled to the memory control circuit 12 through a signal bus 92. A DRAM interface buffer memory circuit 100 is coupled to the memory control circuit 12 through a signal bus 101. External connections from the DRAM interface circuit 100 to a DRAM memory are provided through various signal lines. An active low output row address strobe signal RAS on a signal line 102 provides an address strobe for the DRAM memory. An active low input/output column address strobe signal CAS on a signal line 104 provides an address strobe for a first or an only DRAM. A second active low output column address strobe CAS2 signal on a signal line 106 provides an address strobe for a second DRAM. An active low output right strobe signal W is provided on a signal line 108. An active low output enable signal G on a signal line 110 is a DRAM output driver enable signal. An address bus 112 provides nine bits of DRAM address A(8:0). Active high input/output signals are provided on a DRAM data bus DQ(3:0).

Figure 2:
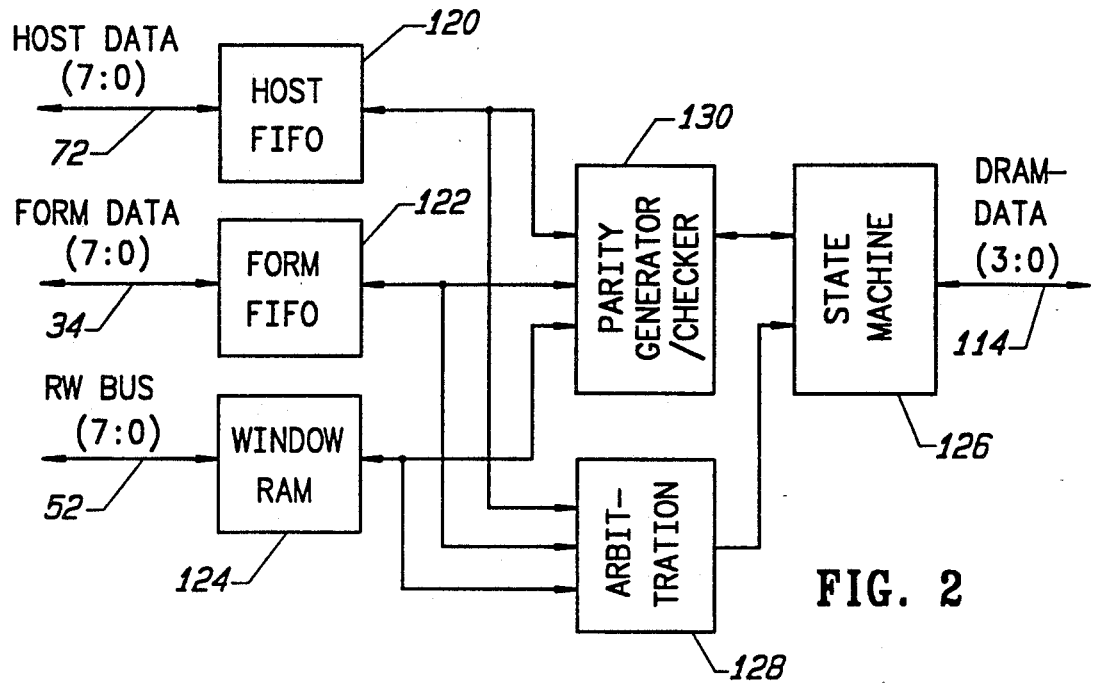
FIG. 2 is a block diagram of the buffer memory control portion of a SCSI controller.

FIG. 2 diagrammatically shows the interface circuits for the integrated circuit 10. The data is transferred to and from three buses 72,34,52 to the DRAM data bus 114. Data from the SCSI data bus 72, that is, Host data is inputted to a Host FIFO 120. Formatted data from the formatter 14 is inputted to a Format FIFO 122. Read/write data from the microprocessor on bus 52 is inputted to a Window RAM 124. Byte/wide data transfers to and from each of these asynchronous interfaces are made to the respective FIFOs. Nibble/wide transfers are made to and from the DRAM between the respective FIFOs under the control of a State Machine 126.

Several different DRAM configurations can be implemented which include: one 4×64K DRAM page mode or static column mode; two 64K×DRAM; one 256K×4 DRAM page mode or static column mode; and two 4×256K DRAMs. The circuit also provides two nibbles of parity for each 32 nibble transfer. Transfers to and from the DRAM are in blocks of 32 nibbles, or 16 bytes. An Arbitration Circuit 128 gives priority for each interface operation to the DRAM. The disc sequencer for the magnetic disc which provides formatted data from the Form FIFO 122 has the highest priority. Refresh of the DRAM buffer memory has the next highest priority. Microprocessor from the read/write bus which is stored in the window ram 124 has the next priority. Finally Host Data on the SCSI bus 72 stored in the Host FIFO 120 has the lowest priority. The Arbitration Circuit 128 arbitrates at the end of each 16 byte transfer and allows only one interface axis to the DRAM at a time. A parity Generator/Checker Circuit 130 provides the two nibbles of parity for each 32 nibble transfer.

Figure 3:
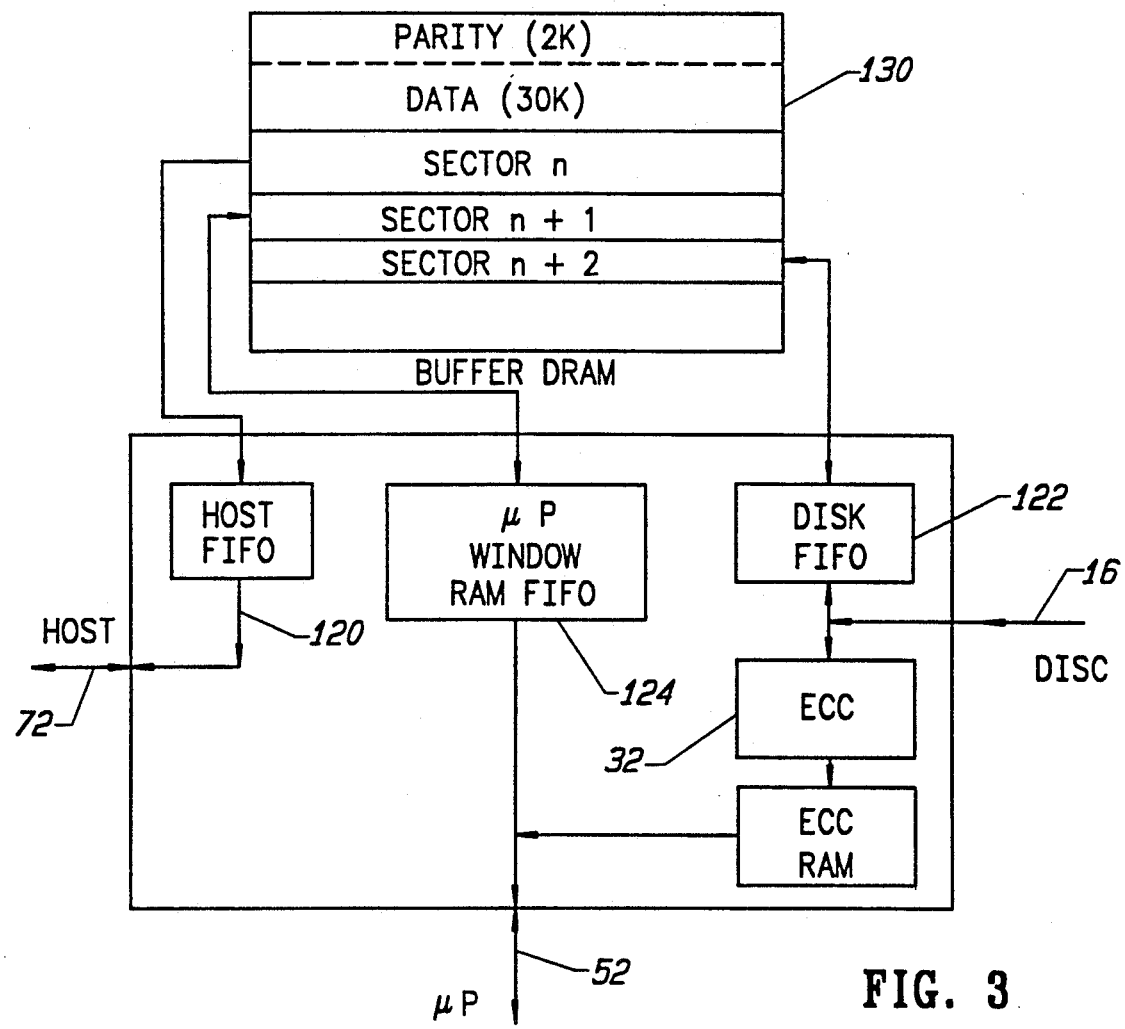
FIG. 3 is a block diagram of the buffer memory controller showing the interfaces required to transfer data from a disk memory to a host computer.

FIG. 3 is a block diagram of the buffer memory controller showing the interfaces required to transfer data from a disc memory to a host computer on the SCSI bus. The controller can handle three asynchronous interfaces to the DRAM buffer memory 130. FIG. 3 diagrammatically shows various sectors of the DRAM buffer memory 130 being utilized. As the disc information is filling sector n+2 of the DRAM buffer 130 from the disc FIFO 122, the microprocessor can be correcting sector n+1 and the Host on the SCSI bus 72 can be reading sector n through the Host FIFO 120.

Figure 4:
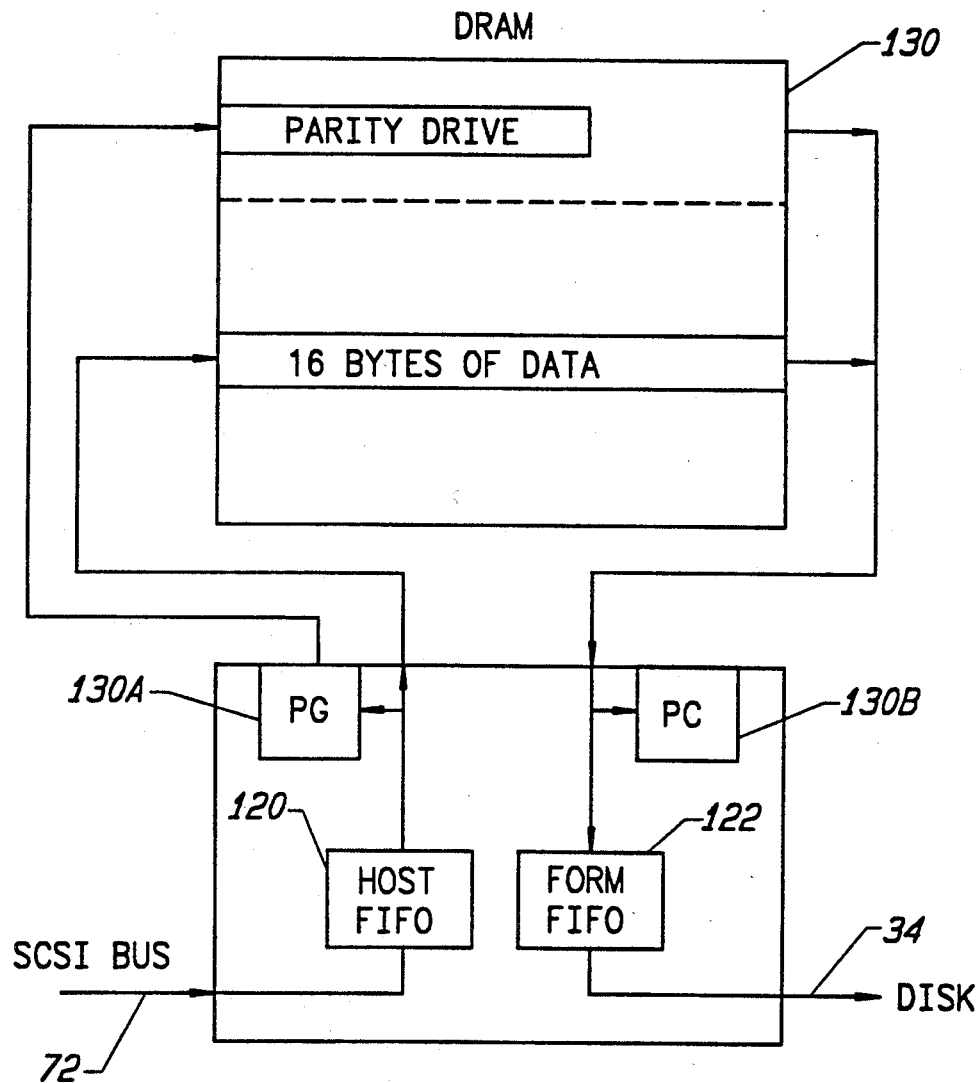
FIG. 4 is a block diagram showing storage of data and parity information in a buffer memory when data is written from a SCSI interface to a disk memory.

FIG. 4 diagrammatically shows storage of data and parity information in a buffer memory when the data is being written from a SCSI bus 72 to a disc memory connected to the bus 34. Information from the Host FIFO 120 is inputted to the DRAM in 16 byte blocks of data. Parity for that block is generated by the parity generator 130a and stored in the parity portion of the DRAM 130. For readout the data is read out from both the parity storage area and the data storage area of the DRAM 130 to the Form FIFO 122. Parity checking on the output data being read out from the DRAM 130 is performed by the parity checker 130b. Parity is generated during the write mode and it is checked during the read mode. Parity is written in a separate place in the DRAM with 2K bytes of address space required for parity for every 32K bytes of total memory.

Figure 5:
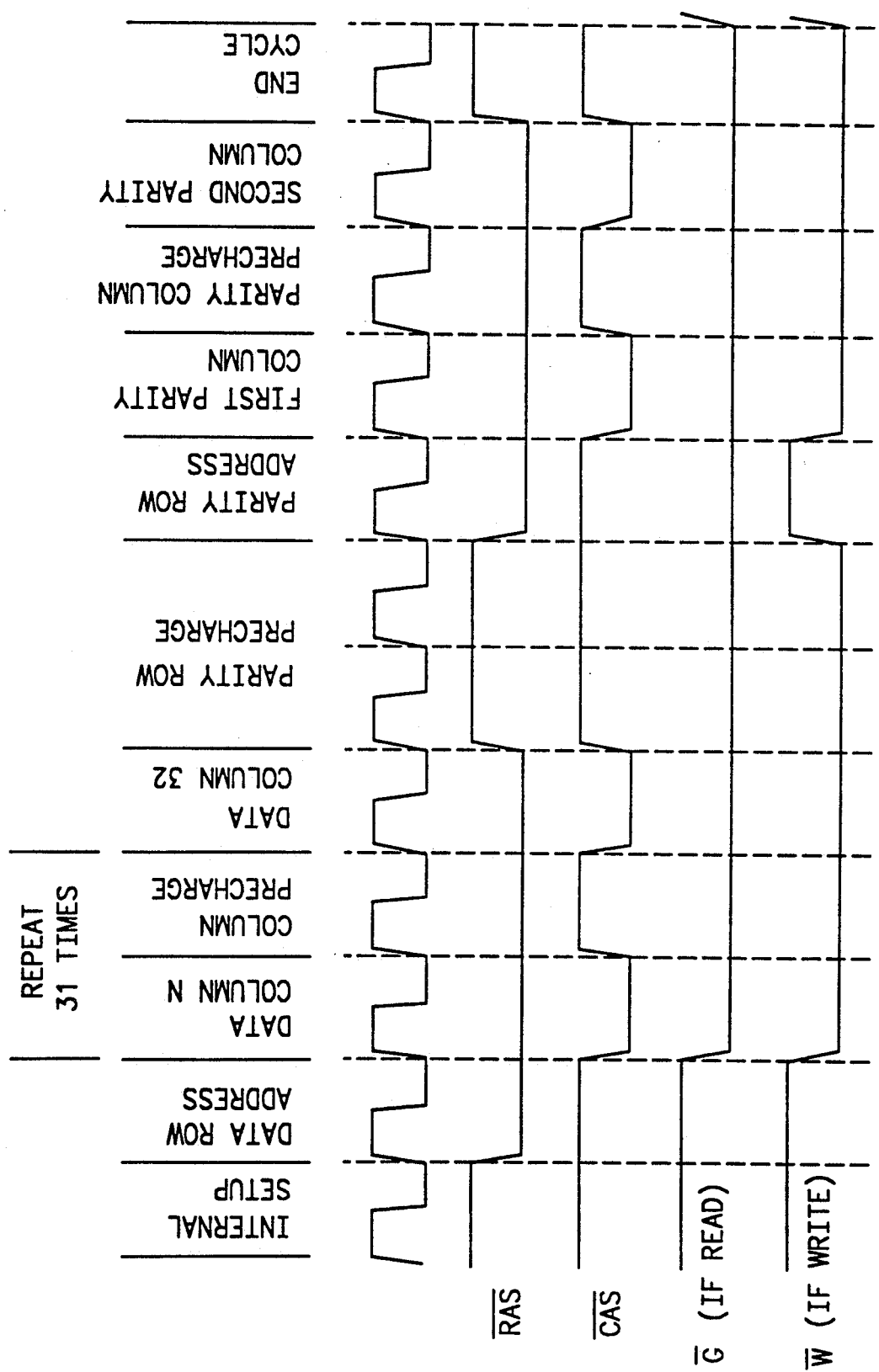
FIG. 5 is a set of timing diagrams for a normal page-mode block transfer of data between the control logic and a DRAM buffer memory.
Figure 6:
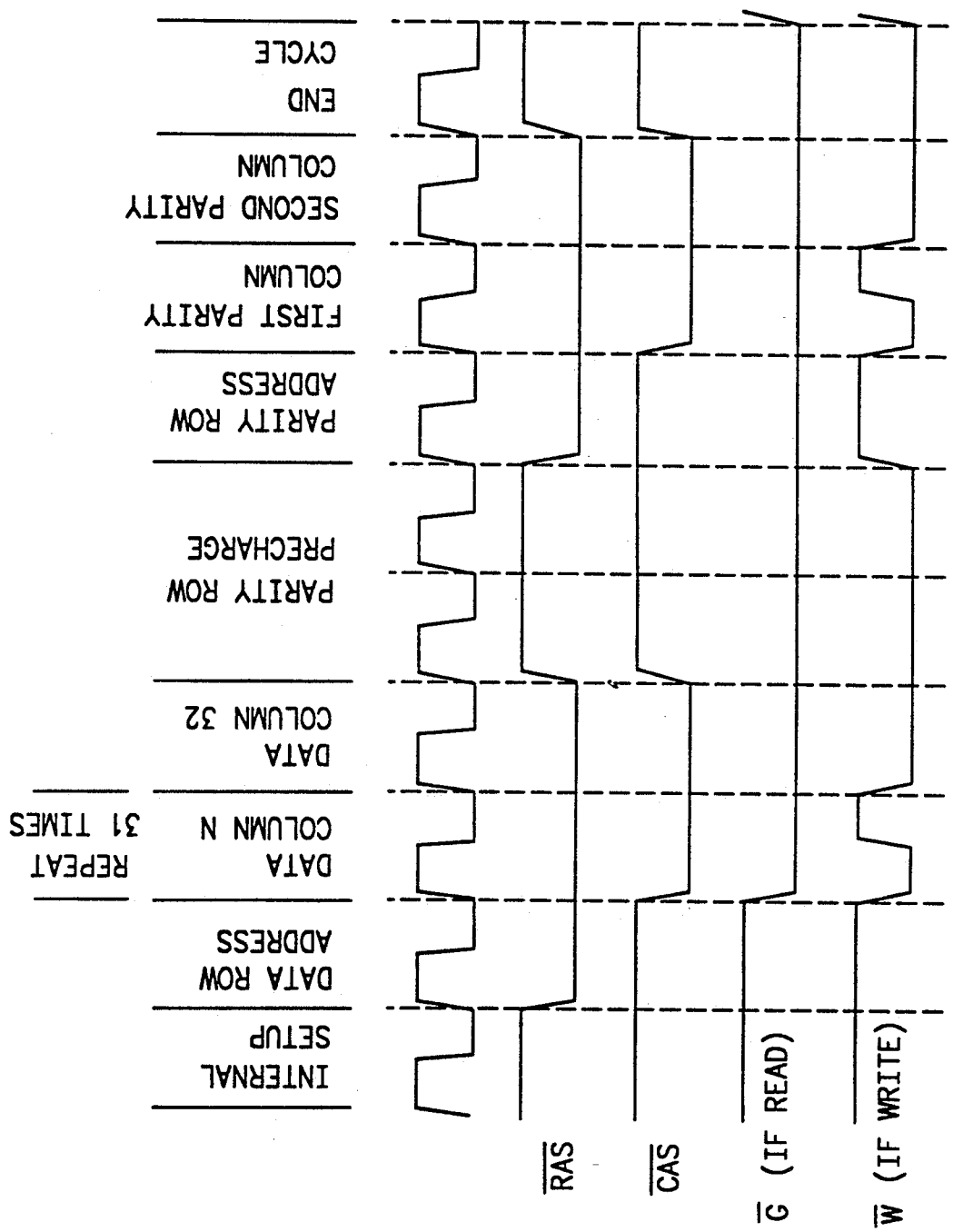
FIG. 6 is a set of timing diagrams for a static-column-mode block transfer of data between the control logic and a DRAM buffer memory.
Figure 7:
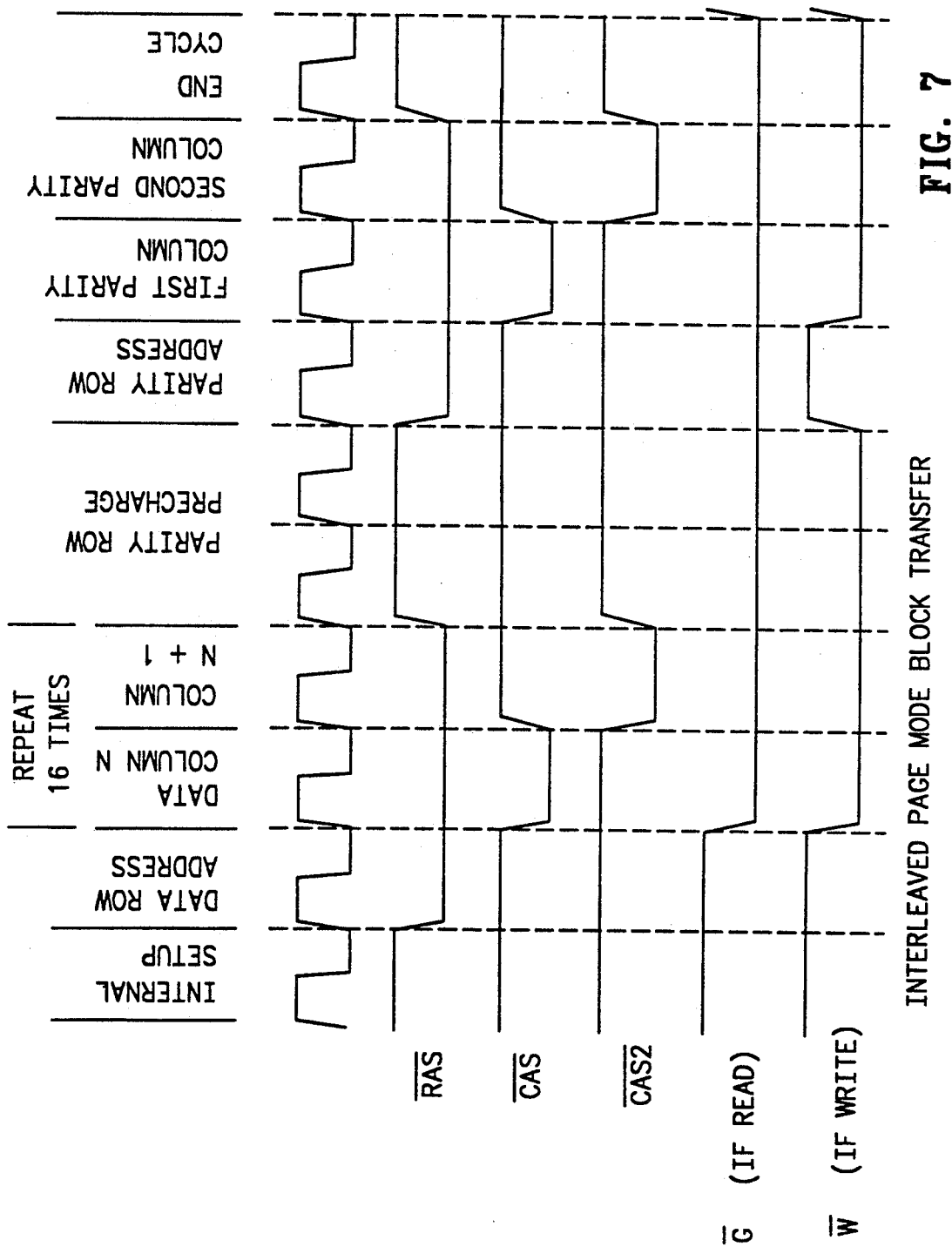
FIG. 7 is a set of timing diagrams for an interleaved page-mode block transfer of data between the control logic and a DRAM buffer memory.

FIGS. 5, 6 and 7 show timing diagrams for various DRAM buffer memory configurations to and from which blocks of data are transferred between the memory control logic 12 and the DRAM buffer memory. The DRAM interface 100 operates on blocks of data which are 16 bytes in length. All transfers of lesser amounts of data are padded by the control logic prior to the DRAM interface receiving the blocks of information. The buffer control logic also calculates parity, which is two nibbles of longitudinal parity for 32 nibbles of data. The DRAM interface 100 performs remapping of the base address of the information to simplify the internal logic. However, parity is always placed in the top 1/16th of the address space of the DRAM as seen from inside. Various sizes of DRAM buffer memory can be used, these sizes include 32K, 64K, 128K, and 256K. One 256K DRAM provides a 32K buffer. Two 256K DRAMs provide a 64K buffer. One 1M DRAM provides a 128K buffer. Two 1M DRAMs provide a 256K buffer.

The transfer sequence for a block of data to a normal page mode DRAM is shown in FIG. 5. First the row address is presented. Then 32 columns of data are transferred. Then the parity row address is presented followed by the parity information from the two parity columns. Note that if a single page-mode DRAM is used, each column of information except the last is followed by a column precharge cycle.

FIG. 6 shows the timing signals for a single static-column mode DRAM. If a single static-column mode DRAM is used, the information from a column is transferred one after another with no intervening precharge cycle required. This greatly increases the speed of data transfer. If two DRAM memories are used, they are automatically alternated so that the precharge cycle for one DRAM occurs at the same time as the column cycle for the other. This results in the same speed as a static-column DRAM would give. Thus there is no advantage in using static-column DRAMs, which are more expensive, in a two-ram configurations. If it is necessary to use static-column DRAMs in a two-ram configuration, these memories can be used in a page mode of operation.

FIG. 7 shows an interleaved page mode timing diagram.

From the timing diagrams, it can be seen that transfer of a single 16-byte block of information in a normal page mode of operation takes 72 cycles of the DRAM clock, while the same transfer in static-column or interleaved page mode is 40 cycles of the DRAM clock. With this information the calculation of the required speed of a DRAM to achieve a buffer bandwidth, as well as the speed of the clock, can be made. For a single page-mode DRAM, the minimum cycle time required is equal to the column access time. While for a single static-column DRAM or two page-mode DRAMs, the minimum cycle time is equal to the column access time plus an address-control skew time. It is recommended that the nominal cycle time be set somewhat slower than the minimum cycle time to allow for speed variations due to voltage ripple on the DRAM power supplies. If a 32K buffer using a single Texas Instruments TMS4464-12 256K page-mode DRAM is used, a 60 nS column-access time is obtained. The clock is set for a cycle time greater than 61.8 nS. The worst case slow cycle time will be 63.8 nS for a total time of 4,594 nS to transfer a 16-byte block of information or a guaranteed bandwidth of 3.48 megabytes/second. If two 256K page-mode DRAMs are used, the clock is set to greater than 64.9 nS transfer a block of information with a guaranteed bandwidth of 5.98 megabytes. If a full 8 megabyte bandwidth is required, a block of information must be transferred every 1961 nS, allowing for refresh, and the worst case time will be 49 nS. This would require the use of a static-column DRAM or a pair of page-mode DRAMS with a column access time less than 45.7 nS.

Figure 8A:
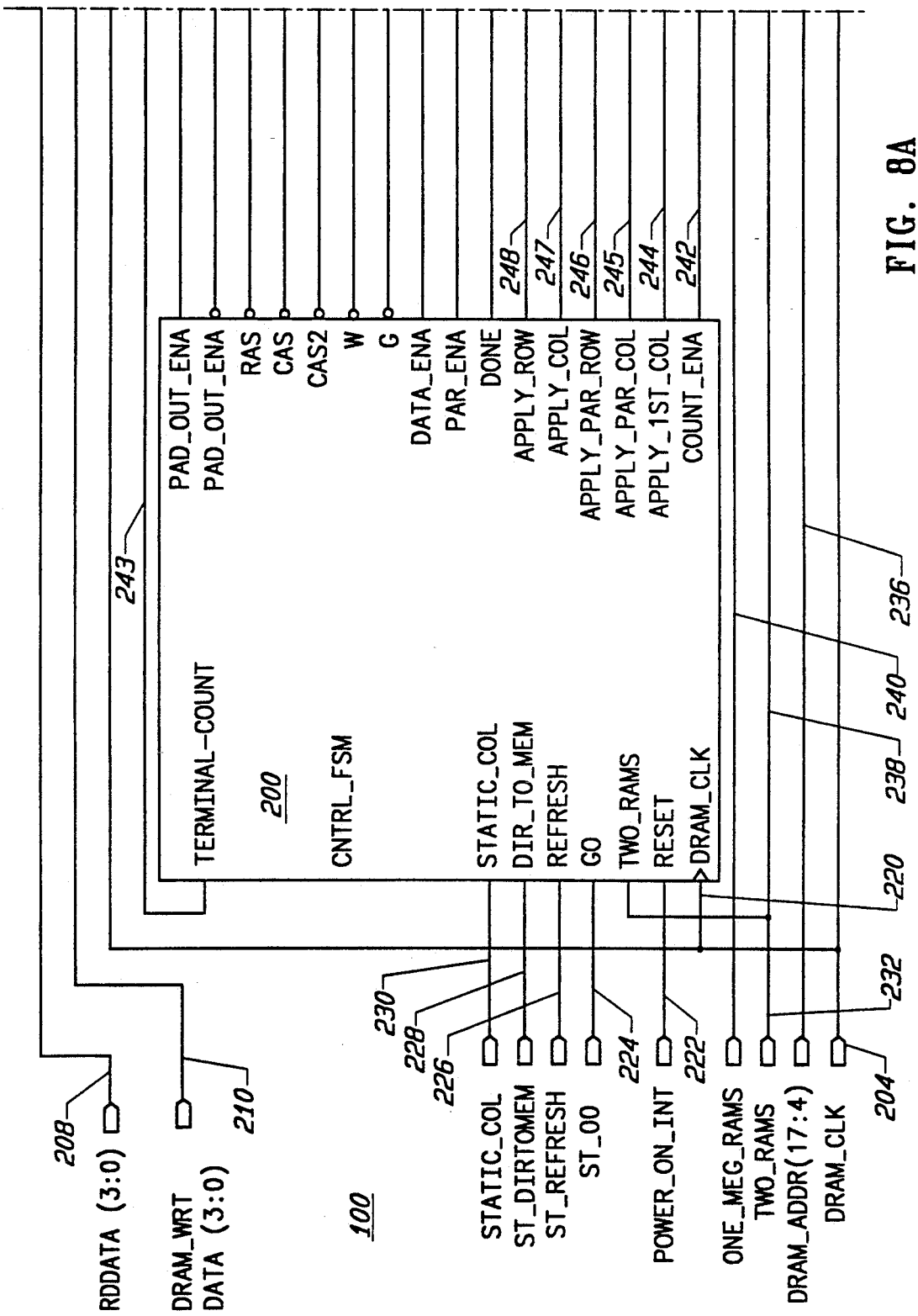
FIGS. 8A and 8B are block diagram of the control logic for a DRAM buffer memory according to the invention.
Figure 8B:
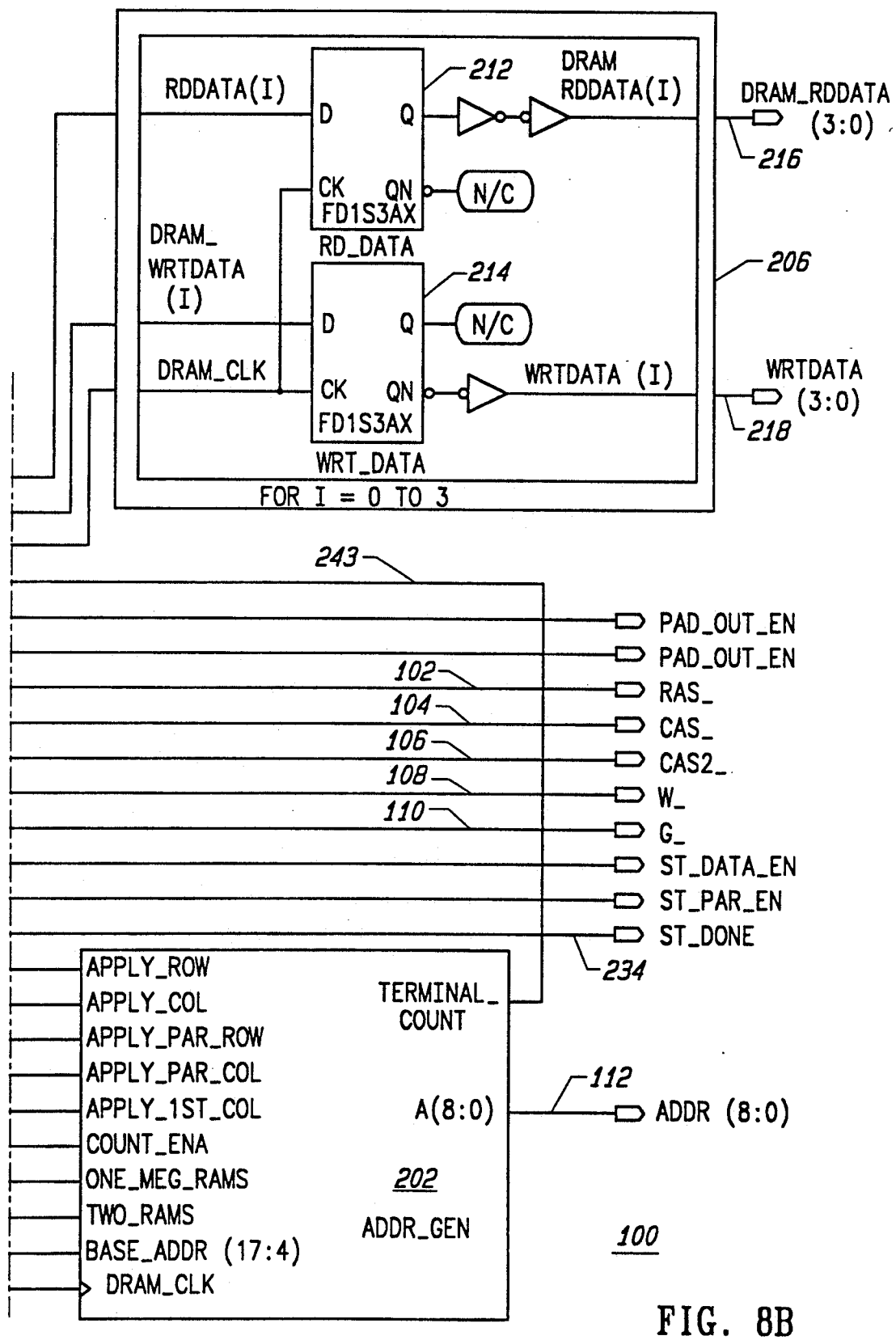

FIGS 8A and 8B are a block diagram of a control logic circuit. It shows the main elements of the DRAM interface circuit 100 of FIG. 1. DRAM interface 100 includes a control state machine 200 and an address generator circuit 202. The address generator circuit 202 provides the address signals on signal bus 112 to the DRAM buffer memory. A DRAM clock signal is provided at an input terminal 204. The DRAM clock signal is distributed to the control state machine 200, the address generator 202 and a block of four pairs of D flip-flops, one of which is typically shown as reference numeral 206. Each pair of the D flip-flops processes, respectively, one bit of the four bits of read data, received on a signal bus 208, or write data, received on a signal bus 210. Each of the respective read data bits and write data bits are returned with the DRAM clock in respective D flip-flops 212, 214. The block 206 shows the retiming circuit for the ith bit. The retimed read data is reassembled than in a data bus 216 and the retimed write data is assembled in the data bus 218, as shown.

The control state machine 200 receives the DRAM clock on a signal line 220. A reset signal is received on a signal line 222. A start signal is received on a signal line 224. A refresh command signal is received on a signal line 226. A signal indicating that a static column DRAM mode is being used is received on a signal line 230. A signal indicating that two DRAMs are to be used is received on a signal line 232. The control state machine 200 provides an inverted row address select RAS signal on signal line 102; an inverted column address signal CAS on the signal line 104; a second column address signal CAS2 on signal line 106; an inverted DRAM right strobe W on the signal line 108 and a DRAM output drive enable signal G on the signal line 110. When 16 bytes of information has been transferred a Done signal is provided on a signal line 234.

The address generator, as previously mentioned, provides nine address bits on a signal bus 112 to the DRAM. The address generator includes a counter which counts from the base address provided as an input to the address generator on a signal line 236. A signal indicating that two rams are being used for buffer storage is provided on a signal line 238. A signal indicating whether one megabit rams are being used is provided on a signal line 240. The counters within the address generator 202 are enabled by a count enable signal provided from the control state machine on a signal line 242. A signal is outputted from the address generator 202 on a signal line 243 to the control state machine 200 when a count of 32 is reached in the address generator indicating that the end of a block of data has been reached.

Signals pass between the Control_FSM block and the Addr_Gen block on signal lines 242, 244, 245, 246, 247 and 248. These are steering and control signals for the multiplexor logic. Apply_Row steers the multiplexor to form the data row address. Apply_Col tells it to form the data column address. Apply_Par Row forms the parity row address. Apply$_{13}$ Par_Col forms the parity column address. Apply_1st_Col says that this is the first column address of either the data or parity group, and causes the count bits to be set to zero. Count_Ena causes them to count. If Apply$_{13}$ Col or Apply_Par_Col are true, and neither Apply_1st_Col nor Count_Ena are true, the count bits will be held as they are. Terminal_Count is the signal back to the FSM that the count sequence for the data bits has completed, and allows the FSM to move on to the states in which parity is written or read.

Functionally the DRAM interface circuit as shown in FIGS. 8A and 8B supplies the output signals for the DRAM interface 100 as indicated in FIG. 1 of the drawings.

Ordinarily, to support a large number of different sizes of DRAMs it would be required that a large number of addresses be multiplexed by a circuit such as the address generator 202. However, it is possible to fold the addresses required in such a way that the number of address bits required to provide all of the addresses required to the memory for a given bit can effectively be reduced from nine to approximately four. Table 1 as shown below shows a conventional scheme for providing connections for the 14 bits of internal addresses, designated as IA14 through IA4 (as provided on signal bus 236) to the DRAM address lines designated A8 through A0 (provided on the address bus 112) to the DRAM.

Table 1 is shown for two DRAM memory size. The first is a 32K DRAM memory size which is implemented with a 64K byte for DRAM. The second is a 64K DRAM size which is implemented by two 64K×4 DRAMs. For each of these cases various ones of the bit lines for the internal addresses are connected to the DRAM address bit lines through multiplexers. For example, with reference to the timing diagram of FIG. 6, the internal addresses for the data roll are provided in the first line of the table, that is in the ROW line. DRAM address A7 receives the internal address line 14. DRAM address line A6 receives the internal address line 13. DRAM address line A5 receives the internal address line 12, and etc. The addresses for column data is provided for 32 different column addresses on the Column line of Table 1. DRAM address bits A4–A0 are provided by counter bits CNT4 through CNT0, which are the output bits of an internal counter. The third row in Table 1 is the parity row addresses and the fourth row in Table 1 is the parity column addresses. For the first example of Table 1, 35 addresses are provided to the DRAM to access row, 32 columns and a parity row in column. Similarly, the second example of Table 1 shows the address multiplexing required for a 64K DRAM memory.

Note that for Table 1, to accommodate two different memory configurations, eight different internal address lines are typically required to be changed. These changes are accomplished by multiplexing the appropriate internal address line and counter output lines to selected DRAM address lines.

TABLE 1

| A8 | A7 | A6 | A5 | A4 | A3 | A2 | A1 | A0 |
|---|---|---|---|---|---|---|---|---|
| 32K (64K × 4 DRAM) | | | | | | | | |
| ROW | IA14 | IA13 | IA12 | IA11 | IA10 | IA9 | IA8 | IA7 |
| COL-UMN | IA6 | IA5 | IA4 | Cnt4 | Cnt3 | Cnt2 | Cnt1 | Cnt0 |
| PR | 1 | 1 | 1 | | IA14 | IA13 | IA12 | IA11 |
| PC | IA10 | IA9 | IA8 | IA7 | IA6 | IA5 | IA4 | I0 |
| 64K (Two 64K × 4 DRAMs) | | | | | | | | |
| ROW | IA15 | IA14 | IA13 | IA12 | IA11 | IA10 | IA9 | IA8 |
| COL-UMN | IA7 | IA6 | IA5 | IA4 | Cnt3 | Cnt2 | Cnt1 | Cnt0 |
| PR | 1 | 1 | 1 | 1 | IA15 | IA14 | IA13 | IA12 |
| PC | IA11 | IA10 | IA9 | IA8 | IA7 | IA6 | IA5 | IA4 |

Table 2 shows how the logic according to the invention maps internal addresses and counters to the DRAM address lines for four different memory configurations. Note that the notation IAn referes to the internal address, assuming that this information is presented as bits 17:4, where the nomenclature "bits 17:4" indicates the range of bits starting from most-significant bit 17, to least-significant bit 4. Cntn refers to the nibble count of having five output bits (see Table 2, Cntn=0 to Cntn=4), which are able to represent thirty-two distinct column addresses, for example, from column addresses one to thirty-two. If two DRAMs are used, only four bits of nibble count are used. Comparison of the first two examples of Table 2 to examples of Table 1 shows that for Table 1 the DRAM bit line A7 has seven different internal bit lines multiplexed into it. For the first two examples of Table 2 bit line A7 has only three internal bit lines multiplexed into it. Thus, Table 2 requires a smaller set of internal address multiplexers to map the internal addresses to the DRAM address bits. This provides a significant reduction in circuit complexity.

TABLE 2

| | A8 | A7 | A6 | A5 | A4 | A3 | A2 | A1 | A0 |
|---|---|---|---|---|---|---|---|---|---|
| | | | (1) 64K × 4 DRAM 32K: | | | | | | |
| Row | (X) | IA8 | IA7 | IA14 | IA13 | IA12 | IA11 | IA10 | IA9 |
| Column | (X) | Cnt0 | Cnt4 | Cnt3 | Cnt2 | Cnt1 | IA6 | IA5 | IA4 |
| Parity Row | (X) | IA8 | IA6 | 1 | 1 | 1 | 1 | IA5 | IA4 |
| Parity Column | (X) | Cnt0 | IA7 | IA14 | IA13 | IA12 | IA11 | IA10 | IA9 |
| | | | (2) 64K × 4 DRAMS 64K: | | | | | | |
| Row | (X) | IA8 | IA15 | IA14 | IA13 | IA12 | IA11 | IA10 | IA9 |
| Column | (X) | IA7 | Cnt4 | Cnt3 | Cnt2 | Cnt1 | IA6 | IA5 | IA4 |
| Parity Row | (X) | IA7 | 1 | 1 | 1 | 1 | IA6 | IA5 | IA4 |
| Parity Column | (X) | IA8 | IA15 | IA14 | IA13 | IA12 | IA11 | IA10 | IA9 |
| | | | (1) 256K × 4 DRAMS 128K: | | | | | | |

TABLE 2-continued

| | A8 | A7 | A6 | A5 | A4 | A3 | A2 | A1 | A0 |
|---|---|---|---|---|---|---|---|---|---|
| Row | IA8 | IA16 | IA15 | IA14 | IA13 | IA12 | IA11 | IA10 | IA9 |
| Column | Cnt0 | IA7 | Cnt4 | Cnt3 | Cnt2 | Cnt1 | IA6 | IA5 | IA4 |
| Parity Row | IA8 | 1 | 1 | 1 | 1 | IA7 | IA6 | IA5 | IA4 |
| Parity Column | Cnt0 | IA16 | IA15 | IA14 | IA13 | IA12 | IA11 | IA10 | IA9 |
| (1) 256K × 4 DRAMS) 256K: | | | | | | | | | |
| Row | IA17 | IA16 | IA15 | IA14 | IA13 | IA12 | IA11 | IA10 | IA9 |
| Column | IA8 | IA7 | Cnt4 | Cnt3 | Cnt2 | Cnt1 | IA6 | IA5 | IA4 |
| Parity Row | 1 | 1 | 1 | 1 | IA8 | IA7 | IA6 | IA5 | IA4 |
| Parity Column | IA17 | IA16 | IA15 | IA14 | IA13 | IA12 | IA11 | IA10 | IA9 |

Figure 9A:
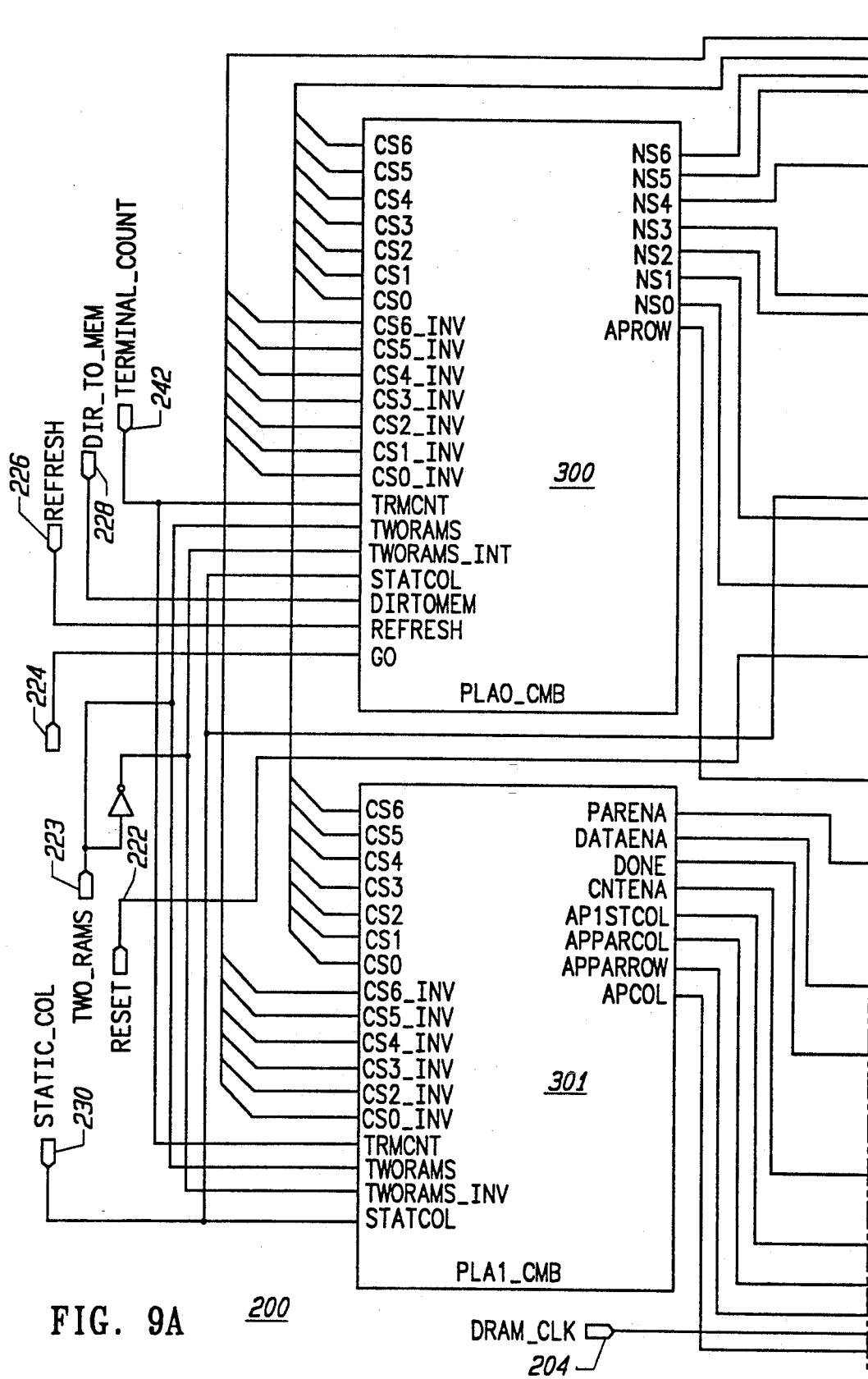
FIGS. 9A, 9B, and 9C are a logic circuit diagram for the state machine portion of the control logic for a DRAM buffer memory according to the invention.
Figure 9B:
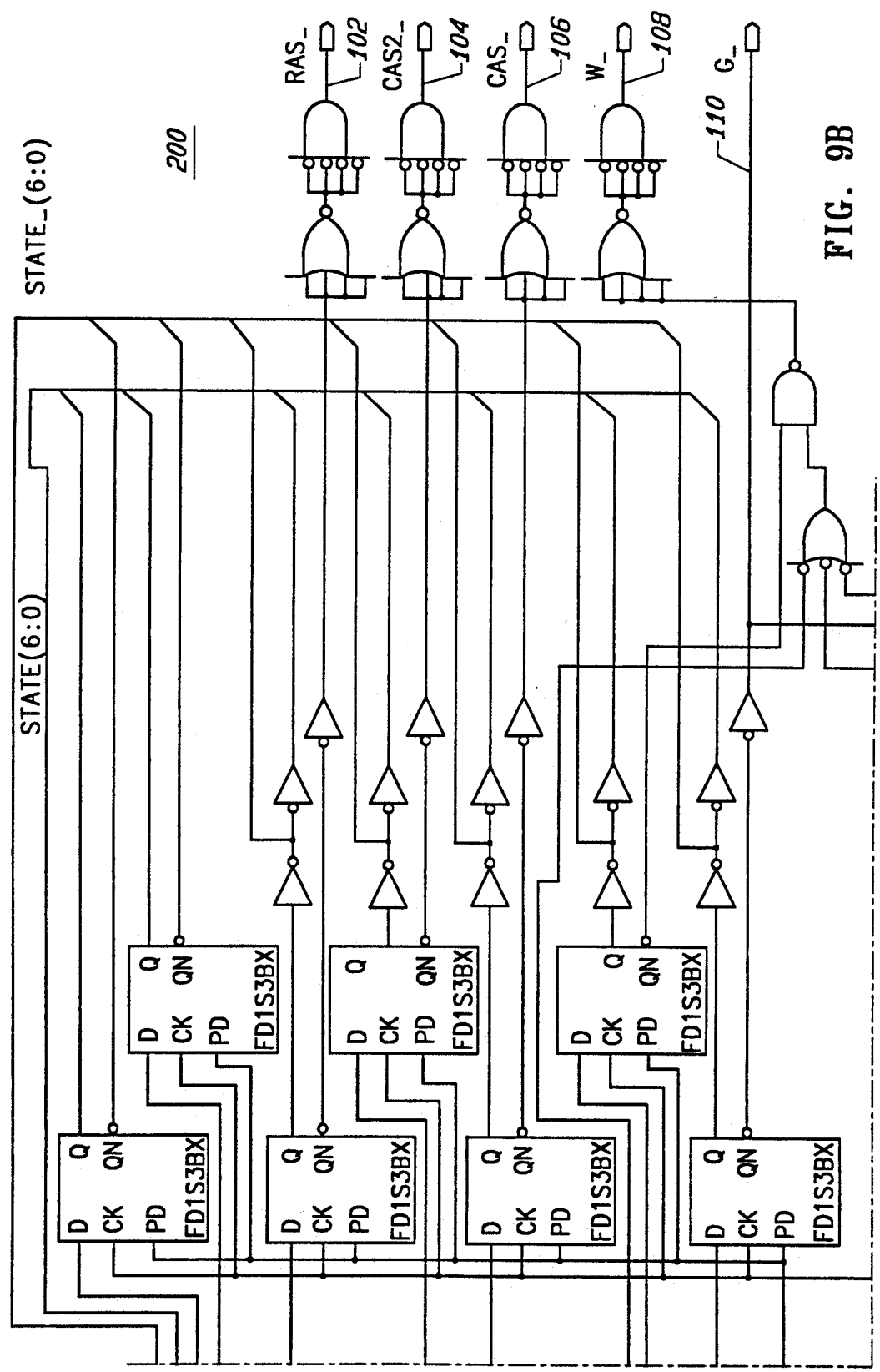
Figure 9C:
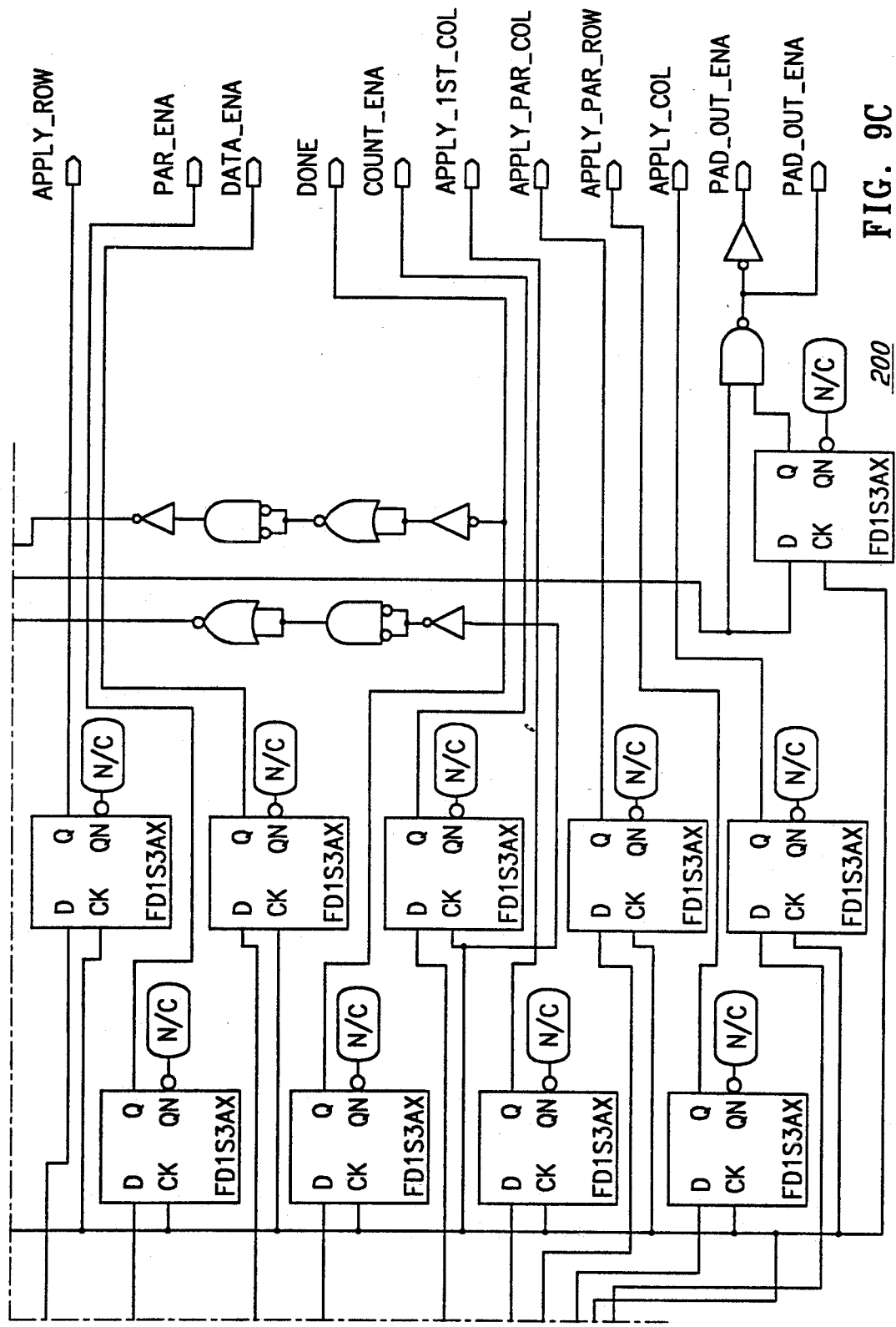

FIGS. 9A, 9B, and 9C are a more detailed block diagram of the control state machine 200, shown in block diagram form in FIG. 8. The control state machine 200 includes a first program logic array PA0 300 and a second program logic array PLA 1 301 which provide combinatorial logic for combining the various input signals to the state machine 200 to provide logic output signals. The DRAM clock at terminal 204 clocks a number of D flip-flops to latch the combinatorial outputs of the program logic arrays 300, 301. Various other logic elements are provided at the output terminals of the various D flip-flops to provide the output signals at the various terminals, as indicated in the drawings.

Figure 10A:
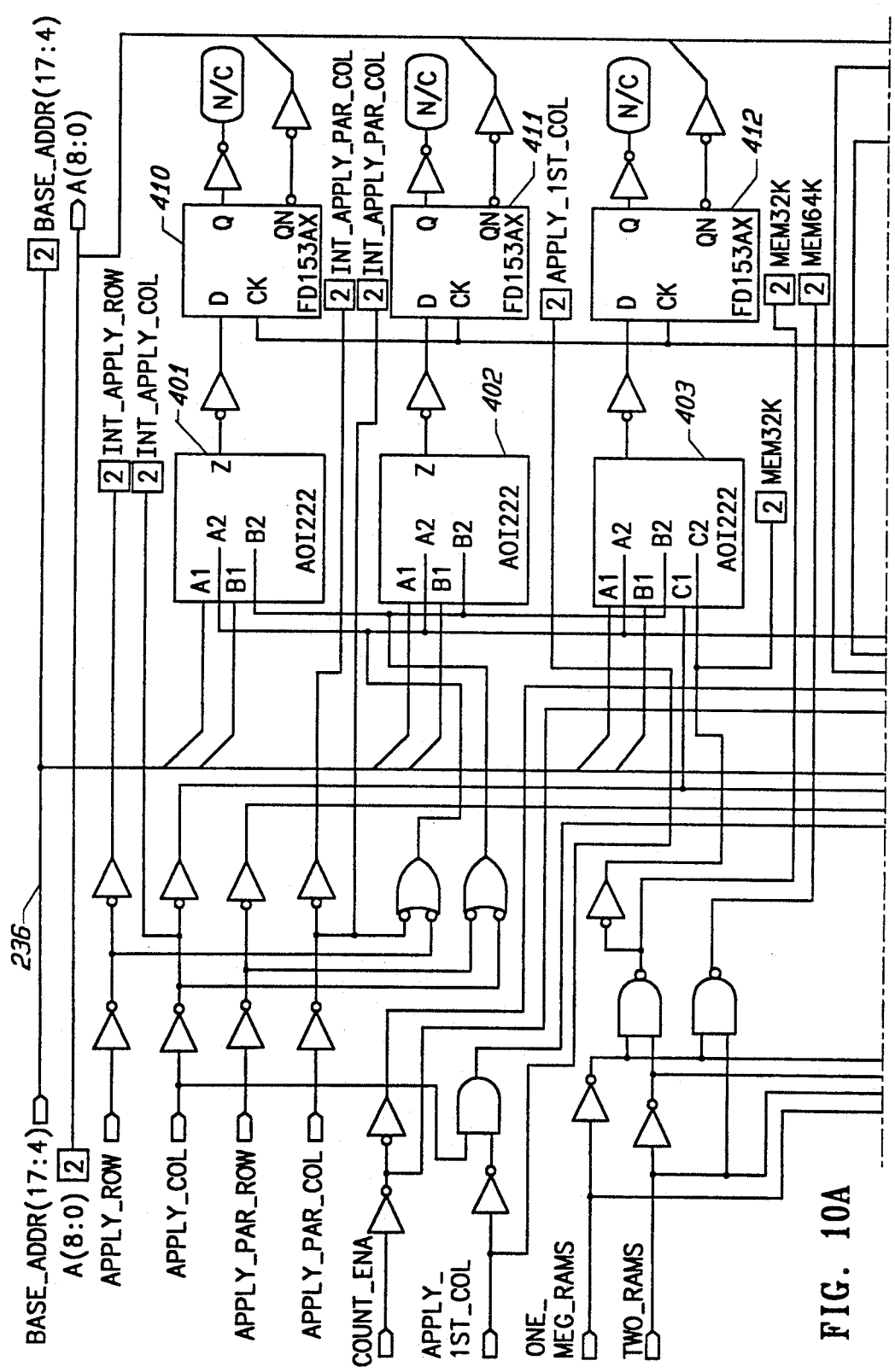
FIGS. 10A and 10B are part of logic circuit diagrams for the address sequencer portion of the control logic for a DRAM buffer memory according to the invention.
Figure 10B:
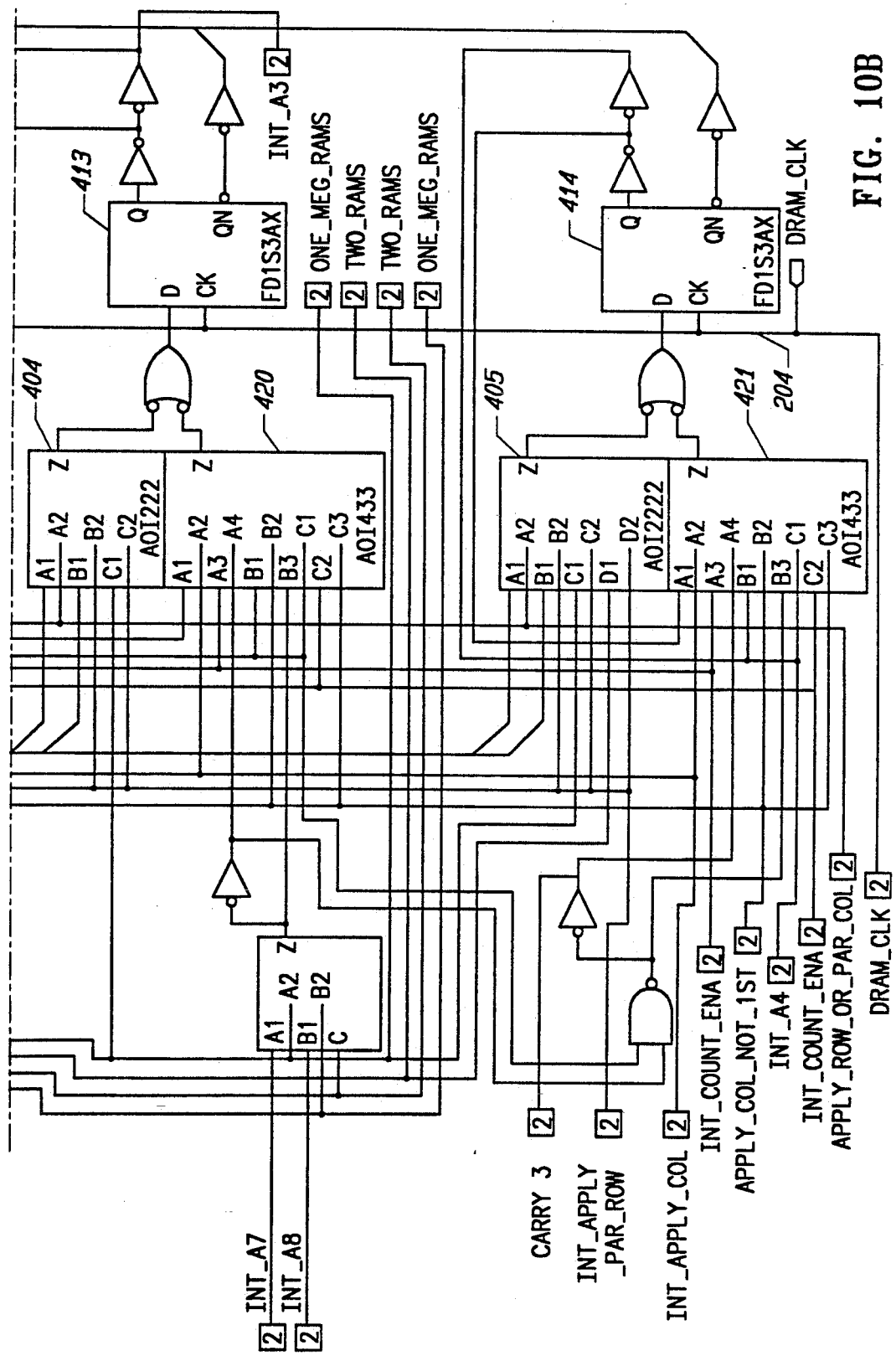
Figure 11A:
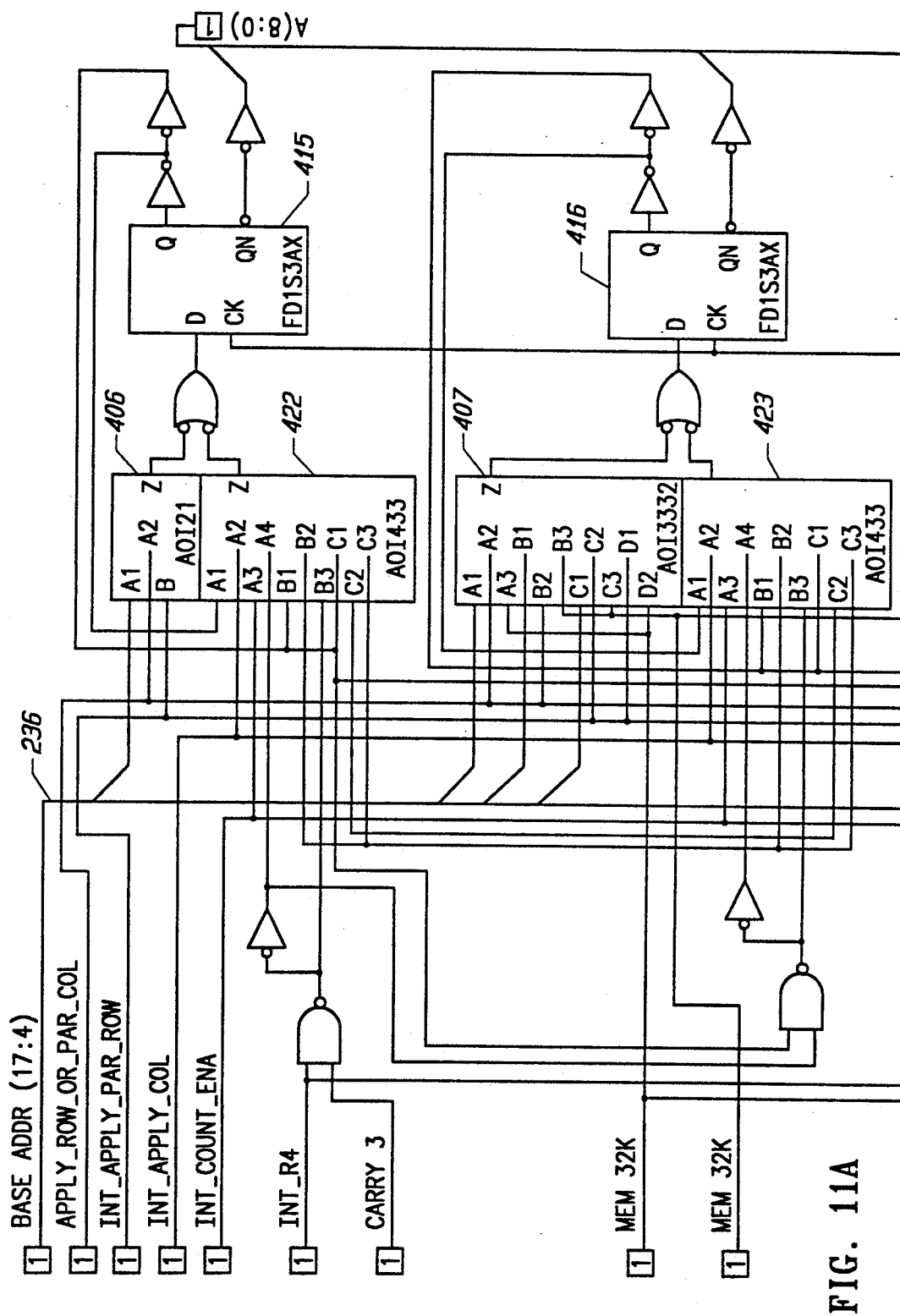
FIGS. 11A and 11B are the rest of the logic circuit diagram for the address sequencer portion of the control logic.
Figure 11B:
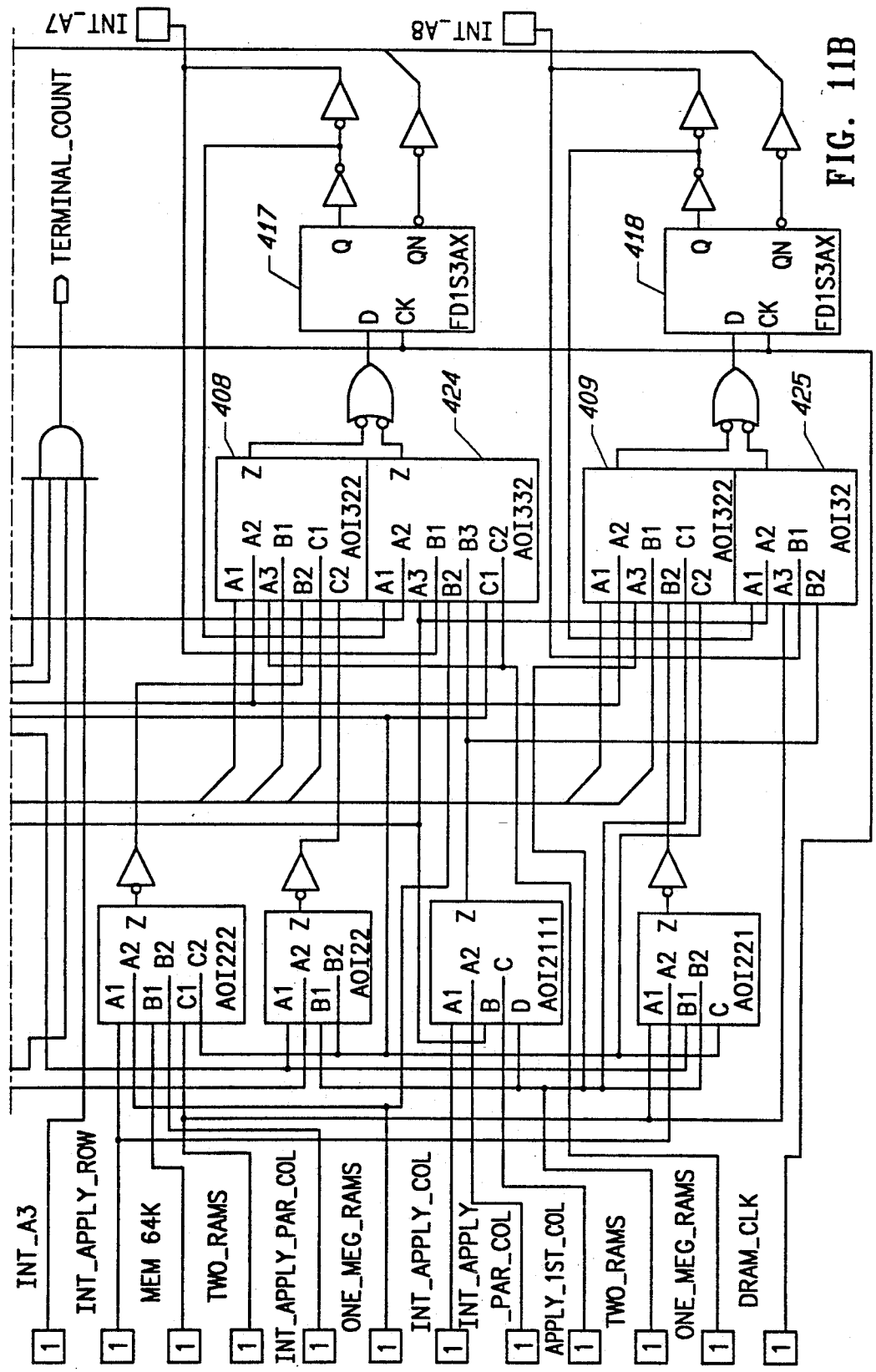

FIGS. 10A, 10B, 11A, and 11B show the circuit details for the address generator circuit 202 shown in FIG. 8 of the drawings. Essentially, these circuits implement the connection arrangement of Table 2. The internal address signals provided on the bus 236 are distributed on that bus to various and/or/invert stages which function as multiplexers 401 through 409 for selection of these address lines in accordance with the internal logic provided by the control state machine 200 and various other logic elements as shown in FIGS. 10A and 10B. Each of these multiplexers 401 through 409 has its output signal coupled to the D input terminals of a respective D flip-flop 410 through 418 control of the DRAM clock provided at terminal 204. The various column count signals CNTN as indicated in Table 2 are provided by output signals from certain of the D flip-flops 413 through 418 being coupled through multiplexers 420 through 425 and latched into the inputs of the D flip-flops 413 through 418.

Note that all of the logic elements shown in the figures of the instant patent application are standard cells and building blocks provided by the ATNT 1.25 Micron CMOS Cell Library.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A computer implemented method for temporarily storing and retrieving x-bit information character data for an information storage system in a y-bit wide buffer memory unit comprising a plurality of DRAMs, where $x/y \geq 2$, the method comprising the steps of:

providing a virtual memory address for each of said x-bit information characters, said information characters being organized into a block comprising z said information characters, where $z > 1$;

translating said virtual memory addresses to corresponding addresses of memory locations in said buffer memory unit for storage of y-bit groups of said block in said buffer memory unit, said translating step including the steps of:

selecting a row address for storage of said block;

selecting a base column address for said block; and successively incrementing said base column address to provide additional column addresses for successive y-bit groups of said blocks;

transferring each of said y-bit groups of said block via a y-bit data bus to an address location in said buffer memory unit determined by said translating step; and providing a x-bit error detection code word for each said block;

selecting an address for storing said x-bit error detection code word in said buffer memory unit, said step of selecting an address including the steps of:

selecting an error detection code word row address;

selecting an error detection code word base column address for a first y-bit group of said x-bit error detection code word;

incrementing said error detection code word base column address by y to provide a second column address for a second y-bit group of said x-bit error detection code word;

transferring said error detection code word via said y-bit data bus to the selected address locations for said x-bit error detection code word in said buffer memory unit.

2. The method of claim 1, wherein the step of translating virtual memory addresses includes the step of selecting row and column addresses using multiplexer circuits.

3. The method of claim 1, further including the step of latching said row and column addresses into latch circuits, and wherein the step of successively incrementing said base column address includes the step of coupling outputs of said latch circuits via multiplexing circuits coupled to inputs of said latch circuits.

4. The method of claim 1, wherein said buffer memory unit is DRAM operating in a page mode.

5. The method of claim 1, wherein said buffer memory unit is DRAM operating in a static column mode.

6. The method of claim 1, wherein the step of transferring said error detection code word includes the step of forming an address for each provided said error detection code word from said base address of said block of data by right-shifting said base address of said block of data a predetermined number of bits and filling the thus-vacated upper bit positions with a fixed bit pattern.

7. The method of claim 1, wherein x is 8, y is 4 and z is 16.

8. The method of claim 1, wherein said information storage system includes a magnetic disk.

9. A computer implemented method for temporarily storing and retrieving x-bit information character data for an information storage system in a y-bit-wide buffer memory unit comprising a plurality of DRAMs where $x/y \geq 2$, the method comprising the following steps:

providing a virtual memory address for each of said x-bit information characters, said information characters being organized into a block comprising z said information characters, where $z > 1$;

translating said virtual memory addresses to corresponding addresses of memory locations in said buffer memory unit for storage of y-bit groups of said block in said buffer memory unit, said translating step including the steps of:

selecting a row address for storage of said block;

selecting a base column address for said block;

latching said row and base column addresses into latch circuits;

successively incrementing said base column address to provide additional column addresses for successive y-bit groups of said blocks, said step of successively incrementing including coupling outputs of said latch circuits via multiplexing circuits coupled to inputs of said latch circuits to increment said column addresses; and transferring each of said y-bit groups of said block via a y-bit data bus to an address location in said buffer memory unit determined by said translating step.

10. The method of claim 9, wherein said information storage system includes a magnetic disk.

11. The method of claim 9, wherein x is 8, y is 4 and z is 16.

12. The method of claim 9, including the further steps of:

providing an x-bit error detection code word for each said block;

selecting an address for storing said x-bit error detection code word in said buffer memory unit, said step of selecting an address including the steps of:

selecting an error detection code word row address;

selecting an error detection code word base column address for a first y-bit group of said x-bit error detection code word;

incrementing said error detection code word base column address by y to provide a second column address for a second y-bit group of said x-bit error detection code word;

transferring said error detection code word via said y-bit data bus to the selected address locations for said x-bit error detection code word in said buffer memory unit.

13. The method of claim 9, wherein the step of translating virtual memory addresses includes the step of selecting row and column addresses using said multiplexer circuits.

14. The method of claim 9, wherein said buffer memory unit is DRAM operating in a page mode.

15. The method of claim 9, wherein said buffer memory unit is DRAM operating in a static column mode.

16. The method of claim 12, wherein the step of transferring said error detection code word includes the step of forming an address for each provided said error detection code word from said base address of said block of data by right-shifting said base address of said block of data a predetermined number of bits and filling the thus-vacated upper bit positions with a fixed bit pattern.

* * * * *